Patented Jan. 19, 1943

2,308,564

UNITED STATES PATENT OFFICE 2,308,564

RECOVERY OF CELLULOSE AND LIGNIN FROM WOOD

Ralph H. McKee, New York, N. Y.

No Drawing. Application May 13, 1938,
Serial No. 207,823

17 Claims. (Cl. 92—9)

This invention relates to the recovery of cellulose and lignin from lignin-containing cellulose material such as wood, flax straw, wheat straw, jute, bagasse and like materials, but the invention is particularly directed to the production of wood pulp and lignin in its natural state from woods such as poplar, maple, white pine, spruce, loblolly pine, wallaba and the like.

The principal object of the present invention is to provide an improved process of extracting lignin from wood to produce wood pulp and to recover the lignin in its natural state.

An important object of the invention is to provide an improved process of producing high quality cellulose from wood.

A further object of the invention is to provide a process of isolating lignin in the form in which it is present in wood and the like.

A further object of the present invention is to isolate from wood or the like the fusible, chloroform-soluble form of lignin in the state in which it naturally occurs in the wood or the like.

A further object of the invention is to isolate from wood or the like the non-fusible, acetone-soluble form of lignin in the state in which it naturally occurs in wood or the like.

Other objects and advantages of the invention will become apparent during the course of the following description.

As is well known, plant materials, such as wood, which are used as raw materials for paper manufacture, consist primarily of cellulose and lignin, the former constituting the major proportion and the latter constituting the minor proportion, together with a comparatively small amount of other compounds such as carbohydrates, oils, resins, etc. In the production of paper pulp from these cellulose materials, the separation of the undesirable substances is, in the main, lignin removal. According to prior practice, the extraction of lignin from plant materials has been conducted by treating the same with bisulfite or alkali solutions at temperatures of about 150° C. By these prior methods, even in their most advanced refinements, the quality of cellulose produced has left much to be desired and for a number of industrial purposes, such as in the rayon industry, the pulps produced have been treated in subsequent operations to increase the alpha cellulose content. Moreover, the lignin extracted by the prior methods has been changed chemically from what it was in the wood, with the result that the extracted form has been of little use industrially. Generally, the extracted lignin has been left in solution in the waste liquors and no attempt has been made to recover the lignin therefrom, although the waste liquors themselves have been used for some purposes.

Inasmuch as lignin constitutes a substantial proportion of the composition of plant materials, forming approximately 30% of the composition of spruce for example, and since, as I have found, lignin in the condition in which it occurs naturally in wood or the like has very important industrial uses, it is apparent that there is an important commercial future for a pulp recovery process which, at the same time, is a recovery process for lignin in the form in which it naturally occurs. The present invention provides such a process.

Broadly speaking, my present process involves the cooking of lignin-containing cellulose material in a solution of certain hydrotropic salts for say about 12 hours at a temperature of about 150° C. Such cooking does not attack the cellulose but does dissolve the lignin present and simultaneously sets carbon dioxide free. No appreciable amounts of volatile organic acid or sugars are formed as are obtained in the present processes of making pulp. At the conclusion of the digesting or cooking operation, the cellulose is filtered from the accompanying liquor, which contains lignin in solution in the state in which 't originally occurred in the wood or the like. Thereafter, the cellulose is washed, preferably with the hydrotropic solvent in diluted condition. If desired, the recovered cellulose may be bleached by any of the customary methods.

The cooking solution, after the separation of the cellulose therefrom, is reused, preferably six or seven times, after which it is treated to recover the lignin therefrom. This is most conveniently accomplished by diluting the hydrotropic solvent with sufficient, usually at least three times its volume, of water to precipitate the lignin from the solution. The precipitated lignin is filtered off, washed, and is available for use for a number of industrial purposes. The filtrate is evaporated to its original concentration of hydrotropic salt content, and is ready for reuse in the process.

Many readily soluble metallic salts of organic acids give with water hydrotropic solvents but for the purpose of the present invention I have found that only such of those salts as are derived from a single benzene ring are efficient in the practice of the invention. Typical salts which are suitable for use in the practice of the present invention are alkali salts of benzoic, salicylic, xylenesulfonic, cymenesulfonic, benzenesulfonic, phenolsulfonic, and toluenesulfonic acids. The alkaline earth salts of such acid, for example, calcium cymenesulfonate or ammonium cymenesulfonate, also will work in the practice of the present invention, but not quite so efficiently as the alkali salts.

Of the above mentioned hydrotropic salts, sodium xylenesulfonate is preferred because at moderate concentrations, say 30 g. of the salt to 70 g. of water, it is an excellent solvent, and when diluted with water to approximately one-third of this concentration, it loses almost all of its solvent character and permits the lignin to be precipitated and recovered. The similar cymene salt in the same concentration is also an excellent solvent but has the disadvantage that in order to precipitate the lignin efficiently, it requires dilution with much more water, say to a solution carrying only about 2% of the sodium cymenesulfonate. The result of this is that in order to recover the solvent for reuse, there is required much greater evaporation of the solution obtained on precipitation of the lignin.

While, as indicated above, certain of these hydrotropic salts possess advantages over some of the others, I have found that at least a measure of success in the practice of my invention can be obtained by the use as a hydrotropic solvent of an aqueous solution of any readily soluble salt derived from a single benzene ring. By "readily soluble" is meant that the solubility of the salt is greater than 50 parts in a hundred in water at room temperature.

In preparing a cooking liquor for use in the practice of the present invention sufficient of a hydrotropic salt, or mixtures of salts, of the character referred to above, is dissolved in water to produce a hydrotropic solvent for the lignin present in wood or the like. As will be apparent, the particular concentration of the salt solution will necessarily vary according to the salt selected, the cellulose material to be treated, the temperature to be employed in the cooking operation, and the length of time to be involved in the cooking operation. In the case of certain of the hydrotropic salts, such as sodium cymenesulfonate, for example, reasonable lignin recovery can be effected with a hydrotropic solvent solution carrying only a small percentage, say around 5–10%, of the hydrotropic salt. However, with others of the hydrotropic salts, more concentrated solutions are advisable. For commercial practice, I prefer to employ a solution carrying at least 30% by weight of the hydrotropic salt. If the solution of the hydrotropic salt is more concentrated, say 50 parts by weight of the salt to 50 parts by weight of water, the solvent action is greater and a larger number of runs can be made before the solution becomes saturated with lignin. However, a greater cost of materials is involved in using a more concentrated solution, as just referred to, and it appears that balancing the cost of material against losses, etc., the most economical solvent to use is a solution carrying about 30% by weight. In the light of the foregoing explanation, taken with the specific disclosure in the example of a typical experimental run set forth below, no difficulty will be encountered by those skilled in the art in preparing suitable hydrotropic solvents with any of the hydrotropic salts of the character referred to.

In the practice of my process, a hydrotropic solvent of the character referred to above is prepared and is preferably used as a pulp cooking liquor in substantially neutral condition. The process can, however, be carried out either in an alkaline, neutral, or acid condition with essentially the same products being formed, although some secondary products may be formed if the treatment is carried out in an alkaline or acid condition. For example, if the process is carried out in an alkaline condition, the alkali will react with carbon dioxide to form sodium carbonate and the lignin will not precipitate so completely. Under acid conditions, there is some hydrolysis of the cellulose with sugar formation, resulting in a lowering of the cellulose yields. However, the process works well with a cooking liquor between pH 3 to 10, but a range of pH 6 to 7 at the start, which will give a liquor with a pH of about 5 at the finish of the cook, is preferred.

The process can be carried out in any conventional pulp cooking apparatus, such as the usual digester, following generally the usual pulp cooking procedure. However, I prefer to employ the apparatus disclosed in my prior Patent No. 1,905,731, granted April 25, 1933.

In the preferred practice of my process, the wood or other cellulose material to be treated is introduced into a digester, such as that disclosed in my patent just referred to, together with a substantial excess of a hydrotropic solvent of the character described above. While the proportion of solvent to cellulose material may be varied considerably, as will be understood by those skilled in the art, I prefer to use the proportion in the neighborhood of 60 parts by weight of the hydrotropic solvent to 8 parts by weight of the cellulose material.

The cellulose material is digested at a temperature of approximately 150° C. for about 11 to 12 hours. While the gas may not be released from the digester until the end of the cooking operation, in which case the pressure rises to about 200 pounds per square inch, I prefer to carry out the operation using continuous or intermittent relief of gas pressure so that the pressure stays in the range of 55 to 70 pounds per square inch pressure. This is advantageous over the customary processes which require pressures of approximately 100 pounds per square inch, in that it permits the use of lighter digesters. The removal of the gas does not decrease the efficiency of the cooking process as it does in the case of the sulfite pulping process, for example.

After the cooking operation is completed, the cellulose, which is still in the chip form, although soft, is roughly broken up, as by means of mechanical agitation, and filtered from the solvent solution of the lignin. The excess of the solvent is then pressed out of the cellulose and the cellulose is washed with a small amount, say an equal part by volume, of fresh hydrotropic solvent, and thereafter with water. The wash liquor first used, i. e., the hydrotropic solvent, is recovered and retained for use in washing the cellulose obtained from the second run in the further practice of the process. I have found that it is advantageous to reuse this washing liquor for a number of times, say for six or seven runs, since, as pointed out in greater detail below, a solution of lignin in the hydrotropic solvent is more effective both in dissolving the lignin from the wood treated and also in washing the cellulose produced.

The solvent solution of lignin which is recovered by filtration after the cooking operation has been completed is reused for cooking a fresh quantity of chips. I have discovered that as the hydrotropic solvent becomes more concentrated with lignin in solution, the solvent becomes increasingly effective as a solvent for lignin. Of course, this is true up until the point where the solvent becomes nearly saturated with lignin, at which point the solvent will carry nearly as much lignin in solution as the hydrotropic salt employed in preparing the solvent. In practice, I have found that the solvent solution can be reused until six or seven runs have been made using the same solvent.

After the solvent has been reused the desired number of times, which is usually for six or seven runs of the process, as stated above, the filtrate from the last lot of cellulose treated with a particular lot of solvent is suitably treated to recover the lignin therefrom. While the lignin can be precipitated from solution by the addition thereto of an electrolyte, such as ordinary sodium chloride, for example, I prefer to precipitate the lignin by diluting the solution thereof with water to a sufficient extent to cause the lignin to precipitate. The amount of dilution required will vary considerably according to the hydrotropic salt used in preparing the cooking liquor. For example, where an alkaline earth salt has been employed, it may be necessary to dilute the liquor with a great excess of water in order to bring the solution down to a concentration of approximately 2% of the hydrotropic salt in order to effect precipitation. However, where the preferred hydrotropic salt, i. e., sodium xylenesulfonate, has been employed, it is necessary only to dilute the liquor with twice its volume of water in order to effect precipitation of the lignin.

After the lignin has been precipitated, it is filtered off from the accompanying liquor, washed, and dried, after which it is ready for use as desired.

The filtrate remaining after the separation of the lignin is then evaporated to its original concentration, whereupon it is ready for reuse in the process. The same cooking liquor may be used repeatedly in the practice of the process until it contains sufficient impurities to render its further use inadvisable until it has been purified. Ordinarily, the same cooking liquor may be used for approximately thirty cooks. After the reuse of the solvent solution for say thirty cooks, the solvent will contain accumulated impurities, which are mostly silica, iron and some organic acids, principally from the oxidation of furfural. When it becomes necessary to purify the cooking liquor of the small amounts of impurities which have been incidentally acquired, this is very simply accomplished by adding a small amount of lime, say one part by weight to about 200 parts by weight of the liquor to be purified. The alkali gives a precipitate of the impurities and on filtration the liquor, after concentration, is again ready for reuse in the process.

As stated above, the cooking liquor originally prepared is preferably used for six or seven runs of the process. The reason for this is that the lignin dissolved in the hydrotropic solvent acts to step up the solution of further quantities of lignin. For example, in a typical instance it was found that with a hydrotropic salt solution of a certain strength, it required the cooking of wood chips for 14 hours at 150° C. for a pure salt solution to remove all the lignin from poplar chips, but that by using the filtrate from that cook, after evaporating the same back to its original concentration of the hydrotropic salt, another lot of poplar chips was completely delignified in between 11 and 12 hours. In other words, the increase in the lignin concentration of the solvent increases the effectiveness of the solvent action of the cooking liquor.

In ordinary pulp making processes, the wood chips are cooked with a cooking liquor which, as the process continues, becomes weaker and weaker. Of course, this is the reverse of an ideal cooking liquor. The ideal cooking liquor is one which becomes more active as the cooking process approaches completeness. That is, the first treatment of the chips ought to be with a weaker cooking liquor and the final treatment to remove the last amount of lignin present ought to be with a stronger cooking liquor. However, none of the foregoing liquors customarily used in prior processes has approached this ideal. On the contrary, the most efficient cooking liquor is present at the beginning of the cooking treatment and the least efficient cooking liquor is present at the completion of the process. As indicated above, the reverse is true in the present process. In other words, the activity of the solution as a lignin solvent increases as the process progresses, due to the increase in the lignin concentration of the solvent, with the result that the last part of any cook is conducted with a more active and effective solvent. As will be appreciated, this constitutes an important advantage of the present process.

After the cellulose has been recovered and washed, as described above, it is then preferably bleached. This bleaching may be accomplished in any suitable manner, but I prefer to employ the modern process now customarily used for bleaching sulfite or sulfate pulp. In other words, the cellulose is first bleached in an acid solution resulting from adding 4% chlorine gas to a water suspension of the pulp. Thereafter, the pulp is washed with water and then further bleached by the use of 1% of chlorine in the form of calcium or sodium hypochlorite. Of course, this second bleaching step is effected in alkaline solution due to the excess of lime or caustic in the hypochlorite. The resulting pulp is then washed and dried, after which it is ready for use as desired.

The yield of cellulose by the present process is substantially higher than by the processes customarily used. For example, the yield of cellulose from poplar wood is about 53% of bone dry cellulose on the bone dry weight of wood, whereas the present processes yield about 46%. In other words, the yield of cellulose by the present process is approximately 15% greater than by conventional processes.

Moreover, the quality of the cellulose produced is substantially superior to the quality of the cellulose produced of conventional processes. For example, a pulp prepared from poplar in the manner described above will have an alpha cellulose content of 89 to 93%, a copper number of 1.9 to 2.3, and an ash content of about 0.01%. Inasmuch as this pulp has a high alpha cellulose content, a low ash, and low copper number, the pulp is particularly fitted for use in the rayon industry. The present rayon pulps commonly used today are sulfite pulps which originally carried about 85% of alpha cellulose and have been treated with a caustic soda solution to remove most of the beta and gamma cellulose, and thereby raise the alpha cellulose content to around 90%. As will be noted, the pulp originally produced in the practice of the present process has an alpha cellulose content of 89 to 93%. As is well known, ordinary pulping processes degrade a part of the true alpha cellulose into the forms known as beta and gamma cellulose or hemicellulose. By the use of a hydrotropic solvent of the character referred to above, which is substantially neutral, no degradation occurs, as a result of which it is possible to produce pulp according to the present process which has as high (or higher) an alpha cellulose content as a sulfite pulp which has been subjected to special treatment to remove beta and gamma cellulose.

In addition to producing an increased yield of superior quality cellulose by the practice of the present invention, it is also possible, as stated above, to extract from wood or like plant material the crude lignin in the form in which it occurs in the wood or other vegetable material treated. I have found that by the use of the present process, the lignin of the wood or other vegetable material is extracted by the hydrotropic solvent without altering the chemical composition of the lignin. Moreover, the lignin is present in the cooking liquor, after its extraction in the cooking operation, in the form of a true solution of crude lignin in the solvent. The lignin is not present in suspension or in emulsified form, but is present in true solution.

Moreover, the lignin extraction or recovery in accordance with the present invention is substantially complete. In the case of poplar wood, for example, the total yield of lignin will run between 20 and 30% based on the oven dry weight of the wood.

The crude lignin present in the cooking liquor being of the same chemical composition as the lignin in the wood before extraction, naturally gives the same color reactions as the lignin in its natural state in the wood. For example, the crude lignin present in the liquor gives the same color reactions with phloroglucinol, with aniline, and with naphthylamine as does the lignin in the ordinary wood. Of course, since the actual color which raw wood gives with these various reagents is due in part to an impurity or impurities accompanying the lignin, the color reactions which are given by the lignin in solution (along with the impurity or impurities referred to), which are the same color reactions as are given by raw wood, are less pronounced when the precipitated lignin recovered in the present process has been redissolved in fresh, pure solvent.

Actually, the crude lignin present in wood, which is recovered as such in the present process, is not a single chemical compound, but is made up of at least two lignins. For example, when the solution of lignin in the hydrotropic solvent is progressively diluted, about 90% of the lignin content will first be precipitated and, after substantial further dilution, the remaining 10% will be precipitated. While it is thus possible separately to recover the two forms of lignin by regulated dilution of the solution containing the same, it will be found most convenient merely to dilute the solution sufficiently to precipitate all of the lignin and thereafter separate the two forms of lignin by treatment with other solvents.

I have discovered that approximately ⅔ of the lignin is a non-fusible one, is of light brown color, and is soluble in acetone and alkalies, but is insoluble in chloroform or ethylene dichloride. Roughly ⅓ of the lignin is in a more chemically active form, is quite dark in color with a reddish tone, is thermoplastic, is resinous in type, and is soluble in chloroform, ethylene dichloride, and alkalies.

In preferred practice, the two forms of lignin are separated, if it is desired to separate them, by treating the crude lignin with chloroform or ethylene dichloride. Such a solvent dissolves the fusible form of lignin present, but will not dissolve the non-fusible form of lignin present. Thus, the non-fusible form can be filtered off from the solution of the fusible form. Thereafter, the fusible form can be recovered by evaporating off the solvent.

Whereas in prior pulp cooking processes the lignin derivatives recovered have been of little industrial use, the lignin recovered in the present process has a number of commercial uses. For example, it shows promise as a filler and antioxidant in the rubber industry. It also can be used in lacquer and varnish manufacture. With furfural it gives a condensation product which has the properties of phenol-furfural condensation products and, accordingly, is a cheap material for manufacturing certain plastics. Also, the lignin can be benzylated by treatment with benzyl chloride and a small amount of sodium hydroxide. This lignin is an excellent source of methanol either by heating, preferably with alkali, or by reduction with hydrogen. If desired, the precipitated lignin can merely be used as fuel in the pulp mill and will furnish sufficient steam to meet all of the requirements of the pulp mill as well as some additional steam which might be furnished to an adjacent paper mill, for example.

The following typical experimental run may be taken as an illustrative example of the preferred practice of the present process which has been described in general above:

In this particular run, 800 parts by weight of poplar wood chips were heated with 6,000 parts by weight of a cooking liquor solvent made up of 1800 parts by weight of sodium xylenesulfonate dissolved in 4200 parts by weight of water. This mass was heated in the digester to a temperature of 150° C. for 12 hours. The carbon dioxide gas was periodically relieved in order to maintain the pressure in the neighborhood of 55 pounds per square inch during the process. At the completion of the cooking operation, the mass was subjected to mechanical stirring for the purpose of roughly breaking up the cellulose which was still in chip form, but soft. Thereafter the solvent solution of the lignin was filtered off from the cellulose. The excess of solvent was pressed out, and the remaining cellulose was washed with approximately 25 parts by weight of fresh solvent, of 10 to 15% strength. Thereafter, the cellulose was freely washed with water.

The filtrate separated from the digester was reused in six additional runs of the process until it was nearly saturated with lignin, after which the filtrate was diluted with twice its volume of water and the resulting precipitated lignin filtered off, washed and dried. Of course, the lignin can be precipitated after the first, or any succeeding, run, but it is unnecessary to do this until after six or seven runs have been made with the same solvent.

The fresh solution of solvent used to wash the cellulose produced in the first run was reused as a washing liquor for six additional runs, after which this solution was also diluted to precipitate the lignin dissolved therein.

The cellulose recovered was first bleached in acid solution made up by adding 4% chlorine gas to a water suspension of the pulp. The pulp was then washed freely with water and it was then further bleached by the use of 1% of chlorine in the form of hypochlorite. The pulp was again washed and thereafter dried.

In this example, the cellulose recovery was 53% on the oven dry weight of the poplar wood used, and the yield of lignin was in the neighborhood of 30% on the oven dry weight of the poplar wood. The pulp had an alpha cellulose content of 93%, a copper number of 2.2, and in ash content of about 0.01%.

The washed and dried lignin was treated with ethylene dichloride to dissolve out the fusible form of lignin from the non-fusible form, following which the fusible form was recovered by evaporating off the ethylene dichloride.

In addition to the many advantages of the present process which have been set forth above, there are numerous other advantages of the process, the more important of which are set forth below.

A practical advantage, although not a particularly important one from a commercial standpoint, is that in the practice of the process no obnoxious, ill-smelling gases are vented to the atmosphere as is now the case in connection with both the sulfate and sulfite processes.

A commercially important advantage of the process is that there is produced as a byproduct a substantially pure (about 99%) carbon dioxide gas capable of being compressed without further concentration and sold as dry ice.

Another advantage of commercial importance is that the process can be carried out satisfactorily in either the customary brick-lined sulfite digester or in the customary digesters used in the soda pulp or sulfate pulp industries. However, if the digestion is to be carried out in the ordinary unlined digesters of ordinary steel, the cooking liquor should be maintained in alkaline condition. For example, if the pH is allowed to reach 5, a small amount of iron will go into solution to contaminate the pulp. However, this can be removed by acid bleaching after cooking or, as pointed out above, can be avoided by using an alkaline cooking liquor.

Inasmuch as the cooking liquor can be repeatedly reused, there are not only low evaporation costs but also low mechanical losses. Moreover, the repeated reuse of the cooking liquor means that there are no waste liquors to become a nuisance in the community. Both the cooking liquors and the wash liquors are evaporated and reused and, consequently, do not have to be discarded as waste liquors. This constitutes an important advantage over the customary sulfite process with its objectionable liquors which destroy fish life when discharged into streams, etc.

The absence of fermentable sugars in the cooking liquor is also an advantage.

Moreover, acids volatile with steam (other than carbon dioxide) are not present in the cooking liquor or produced in the process. There is, however, a small amount of furfural formed which can be readily removed from the cooking liquor if its concentration becomes objectionably high.

Unlike the alkaline cooking processes used in producing soda and sulfate pulps, no evaporation to a high consistency is required, no furnace process of recovery of the alkali is required, and no causticizing with lime to regenerate the cooking liquor is required.

The process is particularly well adapted to indirect heating due to its low corrosion effects, non-scaling solvents, low pressure requirements, and thereby good heat transfer. Thus, the process can be advantageously practiced with a digester of the type shown in my prior Patent No. 1,905,731.

The process is not only suitable for treating all types of woods, such as poplar, maple, white pine, spruce, loblolly pine, wallaba and the like, but also flax straw, wheat straw, jute, bagasse, and similar straws.

The process has the additional advantage of bringing into solution not only the lignin present in vegetable materials but also many of the waxes and resins. For example, the process will remove the water soluble portions of wood or the like which require the use of much bleaching material in ordinary pulps. For example, in sulfate pulps, the flavo-tannins form with the cooking liquor a sulfur dye which is difficult to bleach. As a result, many of the sulfate pulps require 15% of chlorine instead of the 5% which my new pulp normally requires. Also, the hydrotropic solvents used in the process remove the alcohol and ether soluble portions of wood, such as pine wood. As contrasted with this, the sulfite process leaves these resinous materials in the pulp almost completely, while the soda and sulfate processes remove them only partially.

Among additional advantages are that a plant investment for practicing the present process will be smaller, plants can be located with less regard to chemical supply and transportation, and water requirements will be lower than in ordinary processes.

The term "hydrotropic" is used herein in its physico-chemical sense, i. e., as applying to materials which have the property of transforming certain substances normally insoluble in water into clear, watery solutions.

The term "digesting" is used herein in the same sense it is customarily used in the paper pulp industry, i. e., heating with a solvent liquor.

While I have described in detail the preferred practice of my process, it is to be understood that the details of procedure may be variously modified without departing from the spirit of the invention or the scope of the subjoined claims.

I claim:

1. In a process of the characted described, the step comprising cooking lignin-containing cellulose material at an elevated temperature in the neighborhood of 150° C. in a hydrotropic solution which comprises essentially an aqueous solution of a readily soluble salt of an acid derived from and containing a single benzene ring of a concentration of over 10%.

2. A process in accordance with claim 1 in which said salt is an alkali-forming metal salt of benzoic acid.

3. A process in accordance with claim 1 in which said salt is an alkali-forming metal salt of salicylic acid.

4. A process in accordance with claim 1 in which said salt is an alkali-forming metal salt of an aromatic sulfonic acid derived from and containing a single benzene ring.

5. A process in accordance with claim 1 in which said salt is an alkali metal xylenesulfonate.

6. A process in accordance with claim 1 in which said salt is sodium xylenesulfonate.

7. The process of separately recovering cellulose and lignin from plant materials which comprises cooking the plant material in a cooking liquor comprising a hydrotropic solvent which comprises essentially an aqueous solution of a readily soluble salt of an acid derived from and containing a single benzene ring of a concentration of over 10%, separating the cellulose from the accompanying liquor, and diluting the liquor by the addition of water to precipitate the lignin present therein.

8. A process in accordance with claim 7 in which said salt is an alkali-forming metal salt of benzoic acid.

9. A process in accordance with claim 7 in which said salt is an alkali-forming metal salt of salicylic acid.

10. A process in accordance with claim 7 in which said salt is an alkali-forming metal salt of an aromatic sulfonic acid derived from and containing a single benzene ring.

11. A process in accordance with claim 7 in which said salt is sodium xylenesulfonate.

12. The process of producing pulp from wood chips which comprises cooking said wood chips at an elevated temperature in the neighborhood of 150° C. in a cooking liquor comprising a hydrotropic solution which comprises essentially a readily soluble salt of an acid derived from and containing a single benzene ring of a concentration of over 10%, separating the resulting pulp from the accompanying liquor, and washing said pulp.

13. A process in accordance with claim 12 in which said salt is an alkali-forming metal salt of benzoic acid.

14. A process in accordance with claim 12 in which said salt is an alkali-forming metal salt of salicylic acid.

15. A process in accordance with claim 12 in which said salt is an alkali-forming metal salt of an aromatic sulfonic acid derived from and containing a single benzene ring.

16. The process of treating lignin-containing plant materials to recover lignin therefrom in the form in which it is present in said plant materials which comprises cooking the material to be treated in a hydrotropic solution which is a solvent for lignin and which comprises essentially an aqueous solution of a readily soluble salt of an acid derived from and containing a single benzene ring of a concentration of over 10%, separating the solid matter present from the accompanying liquor, and precipitating lignin out of said liquor by diluting the same with water.

17. In a method of treating plant materials wherein the plant material is subjected to a cooking operation which causes the production of carbon dioxide and wherein the gas produced from the cooking operation is separated and recovered, the improvement for effecting the production of the carbon dioxide in substantially pure condition which comprises cooking the plant material to be treated at an elevated temperature in the neighborhood of 150° C. in a cooking liquor comprising a hydrotropic solution which comprises essentially an aqueous solution of a readily soluble salt of an acid derived from and containing a single benzene ring of a concentration of over 10%.

RALPH H. McKEE.